(12) United States Patent
Oakley

(10) Patent No.: US 6,281,873 B1
(45) Date of Patent: Aug. 28, 2001

(54) VIDEO LINE RATE VERTICAL SCALER

(75) Inventor: David Oakley, San Diego, CA (US)

(73) Assignee: Fairchild Semiconductor Corporation, So. Portland, ME (US)

(*) Notice: Subject to any disclaimer, the term of this patent is extended or adjusted under 35 U.S.C. 154(b) by 0 days.

(21) Appl. No.: 08/948,196

(22) Filed: Oct. 9, 1997

(51) Int. Cl.$^7$ ................ G09G 5/00; H04N 7/01
(52) U.S. Cl. .......... 345/127; 345/130; 348/581; 348/448; 348/458
(58) Field of Search ............ 345/127, 130, 345/131, 439, 191, 509, 340, 132, 129; 348/441, 446, 458, 581, 459, 384, 453, 448, 580; 382/279, 265; 364/724.12, 728.01

(56) References Cited

U.S. PATENT DOCUMENTS

| | | | |
|---|---|---|---|
| 4,088,506 | 5/1978 | Wetzel | 106/288 |
| 4,247,695 | 1/1981 | Fitzgerald | 546/49 |
| 4,322,750 * | 3/1982 | Lord | 358/140 |
| 4,768,084 * | 8/1988 | Noda | 358/44 |
| 4,804,417 | 2/1989 | Fujita et al. | 106/498 |
| 4,895,949 | 1/1990 | Jaffe et al. | 546/56 |
| 4,987,373 | 1/1991 | Soo | 328/155 |
| 5,274,372 * | 12/1993 | Luthra | 341/61 |
| 5,453,846 | 9/1995 | Tsao et al. | 358/448 |
| 5,469,222 * | 11/1995 | Sprague | 348/580 |
| 5,473,342 | 12/1995 | Tse et al. | 345/132 |
| 5,510,843 * | 4/1996 | Keene | 348/446 |
| 5,517,612 * | 5/1996 | Dwin | 345/501 |
| 5,574,572 | 11/1996 | Malinowski et al. | 358/451 |
| 5,619,226 | 4/1997 | Cahill, III | 345/132 |
| 5,638,467 | 6/1997 | Chua et al. | 382/298 |
| 5,646,694 * | 7/1997 | Horita | 348/448 |
| 5,646,696 * | 7/1997 | Sprague | 348/448 |
| 5,671,018 * | 9/1997 | Ohara | 348/452 |
| 5,815,143 * | 9/1998 | Jenney | 345/340 |
| 5,825,367 * | 10/1998 | Shyu | 345/439 |
| 5,892,847 * | 4/1999 | Johnson | 382/232 |
| 5,905,536 * | 5/1999 | Morton | 348/441 |
| 6,046,773 * | 4/2000 | Martens | 348/384 |
| 6,061,094 * | 5/2000 | Maietta | 348/446 |
| 6,118,584 * | 9/2000 | Van Berkel | 359/463 |

FOREIGN PATENT DOCUMENTS

| | | |
|---|---|---|
| 2342907 | 5/1975 | (DE) . |
| 3007158 | 9/1980 | (DE) . |
| 0012432 | 6/1980 | (EP) . |
| 0047117 | 3/1982 | (EP) . |
| 0069396 | 1/1983 | (EP) . |
| 0101163 | 2/1984 | (EP) . |
| 0348347 | 12/1989 | (EP) . |
| 0666288 | 8/1995 | (EP) . |

OTHER PUBLICATIONS

Derwent Abst. 93–167660/20.
Chem. Abst. 195363q. for DE 2,342,907.
Derwent Abst. 95–270481/36 for EP 666288.

* cited by examiner

Primary Examiner—Matthew Luu
Assistant Examiner—Wesner Sajous
(74) Attorney, Agent, or Firm—Skjerven Morrill MacPherson LLP; Norman R. Klivans

(57) ABSTRACT

For conversion of component (VGA) video to television, a hardware efficient process implements line rate vertical scaling within a single integrated circuit without the support of external memory. Scaling and filtering are combined into a single process which is a polyphase filter. The polyphase filter is a low pass filter with a fixed cut off frequency and a programmable delay. By changing the coefficients of the kernel of the polyphase filter, the scaled video signal is time shifted by fractions of the pixel clock. In one example, for every nine incoming horizontal video scan lines, eight lines are outputted thus accomplishing the vertical scaling. The vertical scaling may include a field buffer memory for accommodating a range of incoming video refresh rates, or in concert with special timing of incoming video, may omit the field buffer memory and instead use a one or two line FIFO memory.

9 Claims, 6 Drawing Sheets

| | | | | | | | |
|---|---|---|---|---|---|---|---|
| 00 | 01 | 02 | 03 | 04 | 05 | 06 | 07 |
| 10 | 11 | 12 | 13 | 14 | 15 | 16 | 17 |
| 20 | 21 | 22 | 23 | 24 | 25 | 26 | 27 |
| 30 | 31 | 32 | 33 | 34 | 35 | 36 | 37 |
| 40 | 41 | 42 | 43 | 44 | 45 | 46 | 47 |
| 50 | 51 | 52 | 53 | 54 | 55 | 56 | 57 |
| 60 | 61 | 62 | 63 | 64 | 65 | 66 | 67 |
| 70 | 71 | 72 | 73 | 74 | 75 | 76 | 77 |
| 80 | 81 | 72 | 83 | 84 | 85 | 86 | 87 |
| 90 | 91 | 82 | 93 | 94 | 95 | 96 | 97 |

*FIG. 1*

VIDEO LINE RATE VERTICAL SCALER

BACKGROUND

1. Field of the Invention

This invention relates to video processing and more particularly to a vertical scaling process and apparatus.

2. Description of the Prior Art

It is a well known problem to convert raster scanned RGB video to a television format. RGB video in this context includes VGA, SVGA and XVGA; these are examples of component video formats for personal computers. RGB stands for the red, green and blue channels that comprise the complete RGB video signal. Television refers to the NTSC, PAL and SECAM television timing standards which are used in television sets. Common television data formats are composite video and S-video (Y/C). Most commonly, RGB video from personal computers uses a non-interlaced (progressive) scan while television uses interlaced scan. In e.g. NTSC television there are 525 horizontal scan lines of analog video data per frame divided into even and odd interlaced fields of 262.5 lines each. Each NTSC television frame thus includes an odd field and an even field which are interlaced to form one frame. The refresh rate for NTSC television is 30 frames per second (30 Hz) while the fields are refreshed at twice the frame rate which for NTSC is 60 Hz.

Television sets use a technique known as overscan to insure that the picture fills the entire video display, (e.g. picture tube) framed within the bezel. Unfortunately, this overscan technique, when applied to the output video signal from a personal computer, may result in a display image having truncated upper and lower portions as well as truncated left and right portions. For a computer display image such truncation is not acceptable since useful information may appear in the truncated portions. Thus, in order to display a high resolution personal computer video image on a television set, the size of the image must be decreased to make the picture viewable within the bezel. For most commercially sold television sets, vertical overscan is about 12%. Thus if the personal computer output display image is vertically scaled to fit within 400 horizontal scan lines and the length of the active video scaled by 0.88, all of the display image would appear on a television without being truncated due to overscan.

Another problem encountered with displaying VGA video on a television set is caused by the lower frame rate of television, (50 Hz for PAL, 60 Hz for NTSC) contrasted with the relatively high refresh rates of VGA, is typically 60–75 Hz.

U.S. Pat. No. 5,510,843 issued to Keene et al., incorporated herein by reference, describes this situation and an attempted solution. Keene et al, FIGS. 6 and 7A illustrate a filtering technique which provides vertical scaling, which means reducing the number of input lines to a fewer number of output lines in the output video signal. ("Lines" refers to video horizontal scan lines.) Keene et al., describes vertical scaling to reduce the 480 VGA lines to 400 lines for a television output signal. Note that in a typical NTSC television set (or monitor) a total of only 400 horizontal scan lines are available for the actual active video, allowing for the vertical blanking interval and overscan.

Since therefore it is often desirable to scale down or shrink video frames in a horizontal or vertical direction, the scaling typically involves selectively reducing the number of pixels or rows in the frame.

Hence, while prior art solutions are available to the scaling problem, there is need for improvement, especially in vertical scaling, because most prior art vertical scaling methods require the support of external video memory, increasing cost and complexity. One prior approach, using linear interpolation does not include the flicker filter function. A decimating linear interpolator requires two line stores while the following flicker filter requires two line stores. Consequently, four line stores are needed. Also, certain prior implementations produce artifacts such as intensity modulation in the vertical direction when the incoming column of pixels has alternate pixels on/off.

SUMMARY

This disclosure is directed to a line rate vertical scaling process and apparatus. The vertical scaling is the reduction of M active video lines to N active video lines by e.g. polyphase filtering and matching the active period of the M lines to the active period of the N lines.

The line rate vertical scaling includes: (1) A polyphase filter to reduce the number of lines. In one example, nine lines are filtered down to eight lines. It may be easier in other embodiments to filter eight lines to seven. Also the whole process may be programmable, for example, scaling with a range from 32/64 to 63/64 based upon repeating the scaling sequence every 64 lines. (2) Making the vertical active period of the incoming video source equal to the active video period of the outgoing TV signal. The horizontal scan rate is increased by 9/8 in one example. If the scaling factor is 7/8, then the frequency is increased by 8/7. (3) Flicker filtering is inherent in one implementation because the filtering is low pass with polyphases.

Thus in accordance with this invention, for line rate vertical scaling of video signals, scaling and filtering are combined into a single process, using a polyphase filter. The vertical scaling is implemented by processing columns of pixels. Only a few pixels, e.g. four, are processed at any one time. The actual processing involves taking four successive pixels which in the image are vertically adjacent and convolving them with an adaptive kernel with weights (filter coefficients) preset by the line count to correctly interpolate the outgoing video line. Conversion in this case of 480 incoming active video lines to e.g. 428 outgoing active video lines is executed modulo 9. Thus for every 9 (m) incoming lines, there are 8 (n) outgoing lines. Each outgoing line is thereby the weighted sum of the nearby incoming lines.

In one embodiment, a field buffer memory (e.g. frame store) is used in order to provide timing for dropped lines, and to accommodate a range of incoming vertical refresh rates and to accommodate standard VGA timing. In another embodiment the field buffer memory is omitted and a much smaller FIFO (first in—first out) memory for only one or two lines is substituted. Therefore in this latter case while frame rate conversion is not available, the circuit may easily be implemented on a single integrated circuit. This latter embodiment requires that the incoming video frame rate equals the output video field rate and that the incoming active video period equals the outgoing active video period.

BRIEF DESCRIPTION OF THE DRAWINGS

FIG. 1 shows a portion of a video image (in terms of numbered pixels) for a raster display.

DETAILED DESCRIPTION

Figure 2:
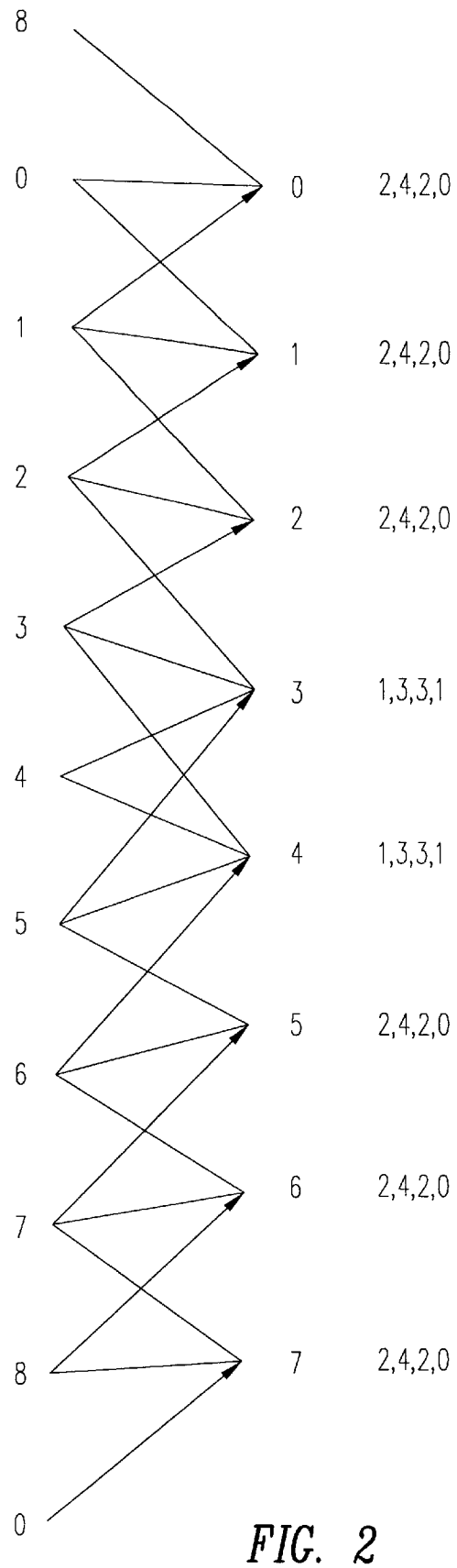
FIG. 2 shows diagrammatically in accordance with the invention how nine incoming lines are filtered down to eight output lines.

Underscan as described above to correct for overscan can be divided into two processes: horizontal and vertical scaling. Horizontal scaling is conventional. Either the frequency of the incoming sampling clock ADCK is decreased or the frequency of the encoder pixel clock PXCK is increased. Reading pixels from memory in a shorter time moves them closer together on each scan line, thus horizontally scaling the image. Vertical scaling is more complex, requiring line, field or frame stores and is the subject matter of this disclosure.

As is well known, displays for PCs (personal computers) and television sets both use a raster scan format where the CRT (cathode ray tube) spot is scanned from left to right in a short period (e.g. 32 microseconds) and from top to bottom in a longer period (e.g. 1/60 sec.). Each frame of the image consists of a collection of horizontal scan lines which are intensity modulated to form an image. For a 640×480 PC image (VGA), there are 480 visible (active) lines, each 640 pixels long. Other VGA resolutions such as 800×600, 1024× 768 and 1280×1024 are frequently encountered. Common VGA vertical refresh rates are 60, 72 and 75 Hz.

Images for PC displays are stored in frame buffer memory. Beginning at the top left-hand corner of the video picture (see FIG. 1), the pixels are stored in a linear sequence from left-to-right and from top-to-bottom. FIG. 1 thus shows the assignment of associated memory locations for the top left hand corner of the image, with each pixel numbered.

The first row of pixels starts at location 00 and continues to the last pixel of the first scan line, which would be number 639 for the 640×480 format. Other rows of pixels follow the first row. For the 640×480 format, the last row would be number 479.

When such a raster image is digitized, the data format of FIG. 1 is retained. Vertical scaling is implemented by processing columns of pixels. For example, consider column 3. With a 640×480 image, to vertically scale down the image by 12% so as to eliminate overscan, the number of lines must be reduced from 480 to 426.

Such line reduction (vertical scaling) is implemented in accordance with the invention in the digital realm by re-sampling after low pass filtering a column of pixels to band limit the spatial frequencies. A polyphase filter low pass filters and re-samples the column of pixels in one operation. The basic frequency response is virtually unchanged by the values of the coefficients. Changing the phase of the filter response by manipulating the filter coefficients sets the position of the interpolated samples. Decimation occurs because n samples are reduced to m=n−1 samples by filtering. Only a few pixels need be processed at one time. For example, in one embodiment of this invention, one output pixel is generated by convolving the four shaded pixels 23, 33, 43, 53 in FIG. 1 with an adaptive kernel with filter coefficients preset by the line count to correctly interpolate the outgoing line.

Integral in this resampling filter process is flicker filtering, an important and well known function incorporated into PC-to-TV video converters. Flicker filtering is implemented in the polyphase filter. A low pass filter having a cut-off set to at most 25% of the lines per picture height will act as a flicker filter. For example, with 480 active lines, there are 240 maximum incoming cycles, so one sets the bandpass of the filter to 120 lines per picture height to comply with Nyquist requirements.

A polyphase filter used in accordance with this invention is a low-pass filter with a fixed cutoff frequency and a programmable delay. By changing the filter coefficients of the kernel, the output can be time shifted by fractions of the clock period. For example, a Gaussian filter with coefficients:

1/4, 1/2, 1/4, 0 has approximately the same response as a filter with coefficients:

1/8, 3/8, 3/8, 1/8 but the output is delayed by ½ clock period. A one clock delay can be implemented by the coefficients:

0, 1/4, 1/2, 1/4

A useful property of a polyphase filter is that for a given cutoff frequency, the output can be delayed in small increments. This is most important for vertical scaling because each output line is the weighted sum of a cluster of e.g., 3 or 4 of incoming lines.

Conversion of 480 incoming lines to 428 outgoing lines is executed e.g. modulo 9, so for every nine incoming lines, eight lines are outputted. Each outgoing line is a weighted sum of the nearby incoming lines.

FIG. 2 shows graphically in accordance with the invention the mapping of nine incoming lines (left column) to eight outgoing lines (second column) and the derivation of the associated filter coefficients (right column). At line 0, the samples line up. As the line count increases, the position of each outgoing line lags the incoming index by 1/8 for each increment as explained above. Each outgoing pixel is formed from the weighted sum of either three or four incoming pixels as indicated by the arrows.

Outgoing pixel zero (OP0) is formed from incoming pixels IP1, IP0 and IP8 (previous 8) with weights (coefficients) 2, 4, 2, 0 in eighths. Pixel OP1 is formed from pixels IP0, IP1 and IP2. Each incoming line of pixels leads to an outgoing line of pixels, as indicated by the arrows, until line 4 is reached. Line 4 does not initiate an output. Instead pixels OP3 and OP4 are formed from four nearby lines with 1, 3, 3, 1 weights.

This process is a convolution of incoming vertical data samples V(n) with a polyphase kernel, $P_n(k)$ which has coefficients set by the index n of the incoming data sample. For any column of pixels on a raster display:

$$Y(n) = \sum_{k=0}^{3} v(n-k) p_n(k)$$

where:

$P_n(k)=$ 2, 4, 2, 0 for n modulo 9=0, 1, 2, 5, 6, 7 (lines 0–2, 5–7); and 1, 3, 3, 1 for n modulo 9=3, 4 (lines 3, 4)

Based upon a÷9 counter incremented after each line, counts 0, 1, 2, 5, 6 and 7 each assign weights 2, 4, 2, 0 to the kernel; counts 3, 4 each assign weights 1, 3, 3, 1.

A frame store following such a polyphase filter is useful for three reasons: timing can be corrected for dropped lines; a range of incoming vertical refresh rates can be accepted; and output TV video timing is standard.

Consider a VGA output consisting of 480 active lines and 525 total lines refreshed at 60 Hz for a progressive scan.

Since interlacing is merely the discarding of alternate lines on alternate frames, consider first VGA to progressive scan conversion. A 12% underscan can be approximated by 8/9th scaling to yield 426.7 lines; one uses 428 lines to avoid edge effects. If one truncates the last line at the lower boundary of the picture, then a full intensity line could occur next to blank which is black. Adding the extra line allows fading of the last line, avoiding flicker effects.

Figure 3:
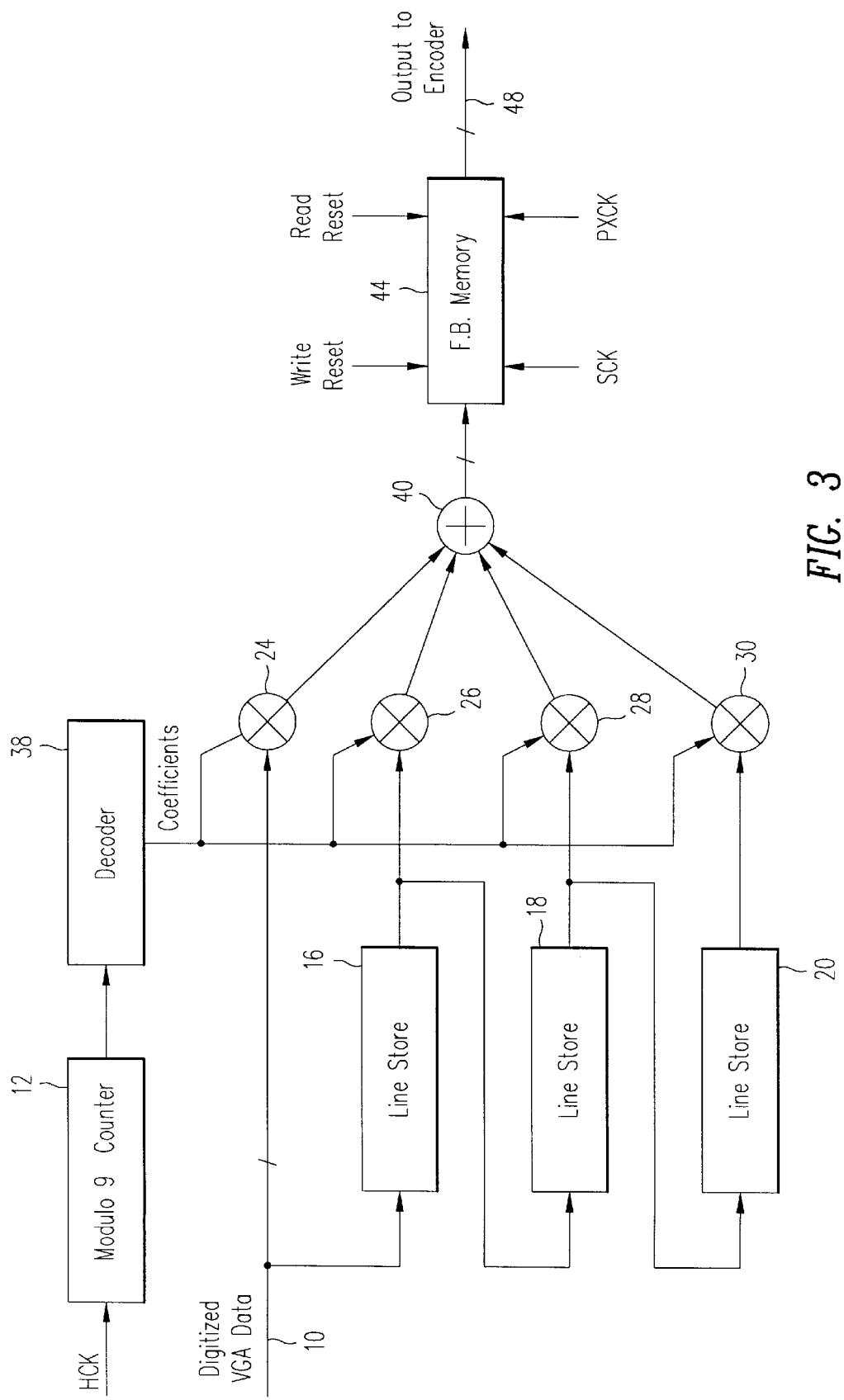
FIG. 3 is a block diagram of a vertical scaling circuit in accordance with this invention.

FIG. 3 is a block diagram of an exemplary circuit for performing this vertical scaling process. It is to be understood that typically this circuit is a portion of an integrated circuit which performs a number of other functions involved with VGA to NTSC/PAL television conversion, such as the Raytheon TMC2360 Flicker Free Video Encoder which is a commercially available product. The various blocks shown in FIG. 3 are each conventional and hence not shown in any further detail. The circuit shown on FIG. 3 is only for the function of vertical scaling and filtering and does not perform the horizontal scaling function or any of the other functions involved with VGA to television conversion. In the FIG. 3 circuit the main input is digitized VGA video data input at port 10. It is to be understood that port 10 is an P bit parallel port where P is equal to e.g. 8. In this case digitized VGA data refers to only one of the VGA components; the VGA components are typically R, G, B or Y, U, V. Therefore in actuality the circuit of FIG. 3 is replicated for instance three times for RGB, one for each of the R, G, and B VGA video components.

The simplest but most expensive (circuitry intensive) implementation is to use RGB processing with eight bits per channel for a total of 24 bits. Each pixel would consist of 3×8 bits. Usually, one transcodes to the 16-bit YUV422 format where Y is the luma signal and chroma signals: U=B−Y, V=R−Y. Y is sampled at full rate. U, V are sampled at half rate and multiplexed to form a full rate stream. With YUV422, one would use two parallel filters. Since data samples proceed: $Y_0Y_1Y_2$ and $U_0V_0U_2V_2U_4V_4$ etc., for each line, the columns of pixels always contain the correctly aligned Y, U or V data. So both filters act correctly although they are entirely ignorant of the incoming data format.

The other main signal input to the FIG. 3 circuit is the horizontal clock signal HCK which is input to a modulo 9 counter 12. Such a counter, as is well known, increments from 0 to 8 and then resets to 0 following the 8 count.

The digitized VGA data input at 10 is coupled into a first conventional line store (single horizontal scan line memory) 16. The output signal from line store 16 is then fed to the second line store 18, the output signal from which is coupled to a third line store 20. Thus one has three delayed video lines plus the original input video line at port 10. Since the sampling clock signal SCK clocks each pixel, these circuits operates individually on each pixel. (Note that typically, for NTSC, there are 800 SCK ticks and one HCK tick per horizontal line.) Hence the line stores 16, 18 and 20, with reference to FIG. 1, are each outputting pixels 33, 43 and 53 respectively while the digitized VGA data at port 10 is pixel 23. These four pixels 23, 33, 43, 53 respectively, are then applied to an input terminal of each of four multipliers 24, 26, 28 and 30.

Decoder 38, which operates in response to the count of counter 12, outputs a set of filter coefficients to each of the multipliers 24, 26, 28 and 30. The value of these coefficients (weights) is thus dependent on the count of the counter 12. Hence, as described above, for lines 0, 1 and 2 and 5 to 7 the coefficients are (2, 4, 2, 0) whereas for lines 3 and 4 the coefficients are (1, 3, 3, 1). Hence this circuit is a low pass filter with a fixed cut off frequency and a programmable delay, the delay being adaptively determined by decoder 38 which changes the coefficients between (2, 4, 2, 0) and (1, 3, 3, 1). By thus merely changing the coefficients of the kernel (filter), the output signal is time shifted by fractions of the clock signal HCK as described above. The cutoff frequency is set by the filter coefficients.

The output signals (products) from each of the multipliers 24, 26, 28, and 30 are summed by adder 40 which provides an n bit digital summed output signal which is input to a field memory (frame buffer) 44. Field buffer memory 44 operates in response to four control signals, which are the write reset, read reset, sample clock (SCK) and pixel clock (PXCK) signals. Write reset sets the write pointer to memory location zero; read reset sets the read pointer to memory location zero; SCK is the incoming pixel clock; and PXCK is the outgoing pixel clock. At the beginning of each incoming frame the pointers are both reset. Field buffer memory is e.g. a field memory, DRAM, SRAM, or other memory.

The output signal from field buffer memory 44 provided on port 48 is sent to an encoder which converts this digital data into analog data for display on a conventional television set. This encoder, being conventional, is not shown but is e.g. of the type of the Raytheon TMC2490 encoder. Besides modulating the UV components on the subcarrier and adding the color burst, encoders also add composite sync (synchronization pulses), including horizontal and vertical sync.

Figure 4:
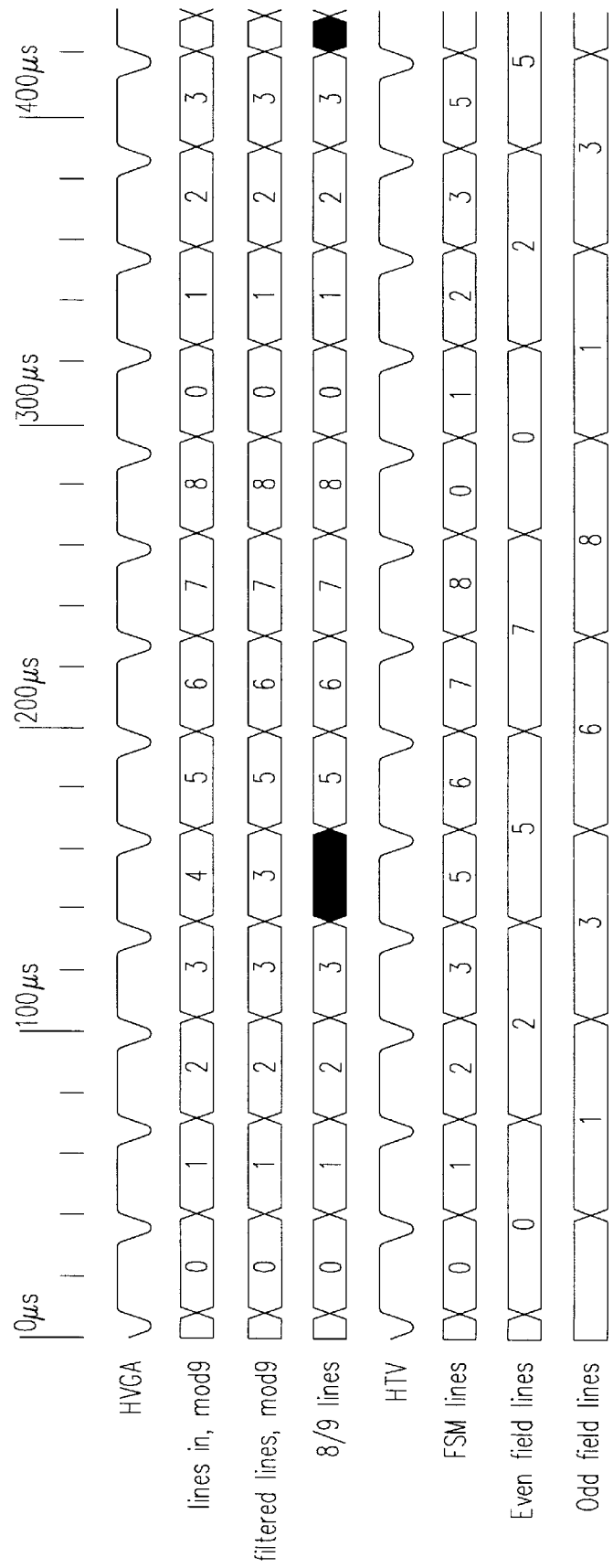
FIG. 4 is a waveform diagram for the circuit of FIG. 3.

Operation of the FIG. 3 circuit is illustrated by the waveforms in FIG. 4 which indicates processing of lines of data, each consisting of pixels clock by the SCK clock. HVGA refers to the VGA horizontal sync. HTV refers to the television horizontal sync. Each group of nine incoming lines is scaled to eight by the polyphase filter to convert 480 lines to 428 lines. An output line is generated for every incoming line. However, lines 3 and 4 initiate redundant outputs allowing one of these lines to be dropped. In FIG. 4, the dropped line is filled black on the "8/9 lines" waveform.

Since one line out of every nine has been dropped by the polyphase filter, the 428 lines are stored in the frame buffer in an uneven timing sequence during a 15.24 msec period. The 428 lines are read out of the frame store in an even timing sequence over a 13.54 msec period, as shown in Table 1:

TABLE 1

Frame Store Embodiment Process Timing

| | Unit | VGA In | Frame Buffer Input | Output | Interlaced |
|---|---|---|---|---|---|
| No. of Lines/field | | 525 | 537 | 525 | 262.5 |
| Vertical Frequency | Hz | 60 | 60 | 60 | 60 |
| Frame Period | msec | 16.67 | 16.67 | 16.67 | 16.67 |
| Horizontal Frequency | kHz | 31.5 | 31.5 | 31.5 | 15.75 |
| No. of Active Lines | | 480 | 428 | 428 | 214 |
| Active Period | msec | 15.24 | 15.24 | 13.54 | 13.54 |
| Blank Lines | | 45 | 45 | 98 | 49 |
| Blank Period | msec | 1.428 | 3.12 | 3.12 | 3.12 |
| Active Period | msec | 15.238 | 15.24 | 15.24 | 15.24 |

At the input to the Frame Buffer Memory ("Frame Buffer Input"), the number of lines has been reduced but there are gaps where lines have been filtered away.

In another embodiment where frame rate conversion between VGA and television can be omitted, vertical scaling is implemented in accordance with the invention without a frame buffer (the field memory). Then the timing of the VGA image source is altered such that the number of visible VGA lines (e.g. 480) occurs in the same time period (e.g. 13.54 msec.) as the outgoing lines (e.g. 427) for the necessary scaling factor (e.g. 0.89). There are three necessary conditions to eliminate the frame buffer:

1) VGA frame rate equals TV field rate;
2) 480 active lines;
3) The VGA active video period equals the television active video period.

The third condition is key, because then no frame buffer memory is required to change the time scale of the active period; only a single line FIFO memory is needed to average the line rate. Parameters for this embodiment are shown in Table 2:

TABLE 2

FIFO Embodiment Process Timing

|  | Unit | VGA In | FIFO Input | Output | Interlaced |
|---|---|---|---|---|---|
| No. of Lines/field |  | 591 | 537 | 525 | 262.5 |
| Vertical Frequency | Hz | 60 | 60 | 60 | 60 |
| Frame Period | msec | 16.67 | 16.67 | 16.67 | 16.67 |
| Horizontal Frequency | kHz | 35.44 | 35.44 | 31.5 | 15.75 |
| No. of Active Lines |  | 480 | 427 | 427 | 213.5 |
| Active Period | msec | 13.54 | 13.54 | 13.54 | 13.54 |
| Blank Lines |  | 111 | 111 | 98 | 49 |
| Blank Period | msec | 3.12 | 3.12 | 3.12 | 3.12 |
| Active Period | msec | 15.24 | 15.24 | 15.24 | 15.24 |

In the Table 2 embodiment, 8/9 scaling is used, as in Table 1. To create 480 active lines in 8/9 of the active time, the horizontal line rate is increased from 31.5 kHz to 35.44 kHz. Instead of 525 lines per VGA frame, there are 591.

Figure 5:
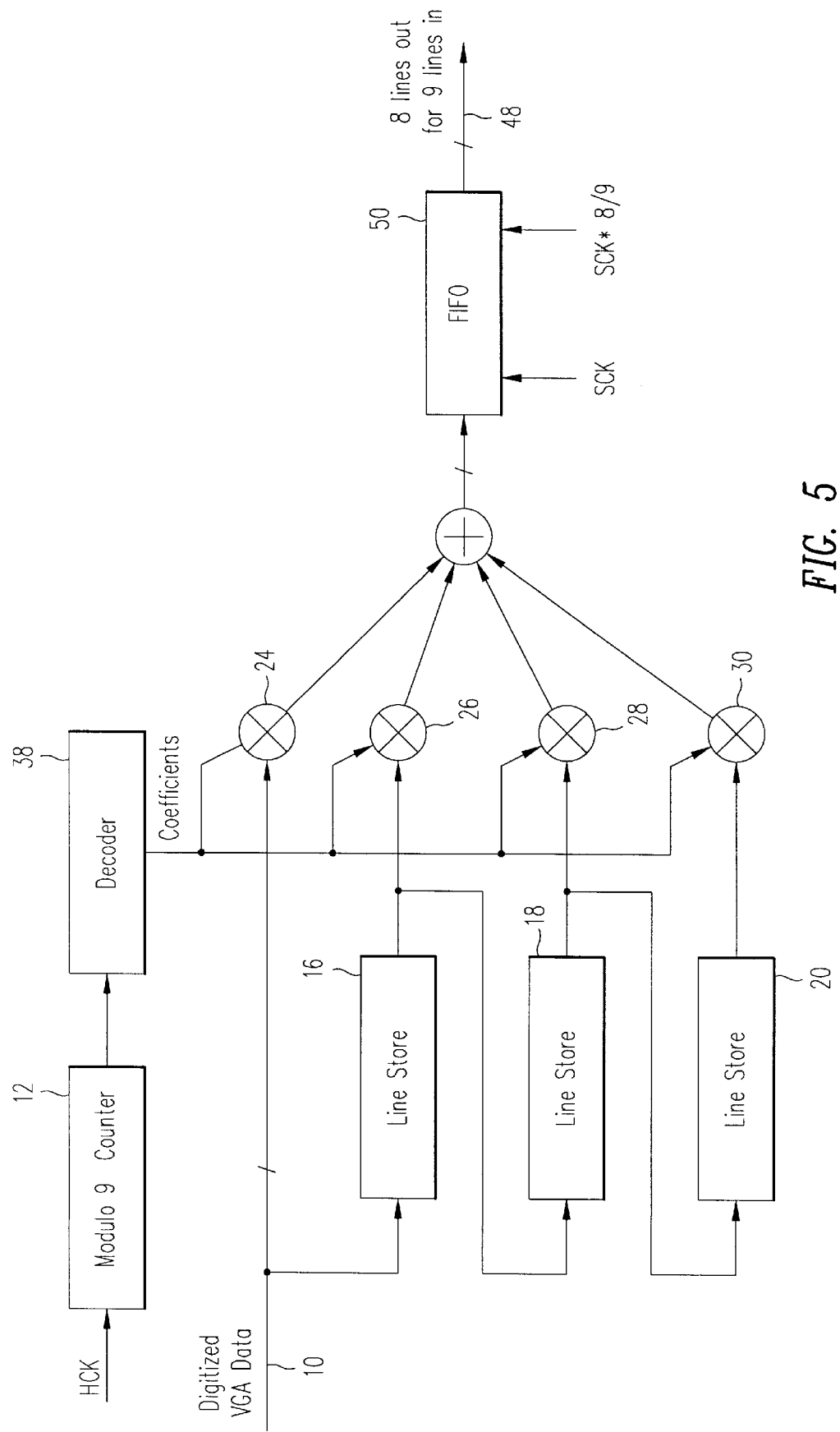
FIG. 5 is a block diagram of a second vertical scaling circuit in accordance with the invention which does not use a frame store, but substitutes a FIFO therefore.

FIG. 5 shows a circuit very similar to that of FIG. 3 with similar elements identically labeled for this vertical scaling process without a frame buffer. The only difference is that instead of the frame buffer memory 44, a FIFO memory 50 is substituted. The FIFO memory 50 stores only one or two lines. Hence the FIG. 5 circuit is more suitable for integration onto an integrated circuit, without external memory, than is the FIG. 3 circuit, since it is usually considered difficult (expensive) to put an entire frame store on a single integrated circuit device with other circuitry. The FIFO memory 50 is timed by only two signals, the sampling clock signal SCK and the modified clock signal SCK*8/9, which is the SCK clock signal multiplied by 8/9. Hence SCK is the FIFO input (write) clocking signal and SCK*8/9 is the FIFO output (read) clocking signal.

Figure 6:
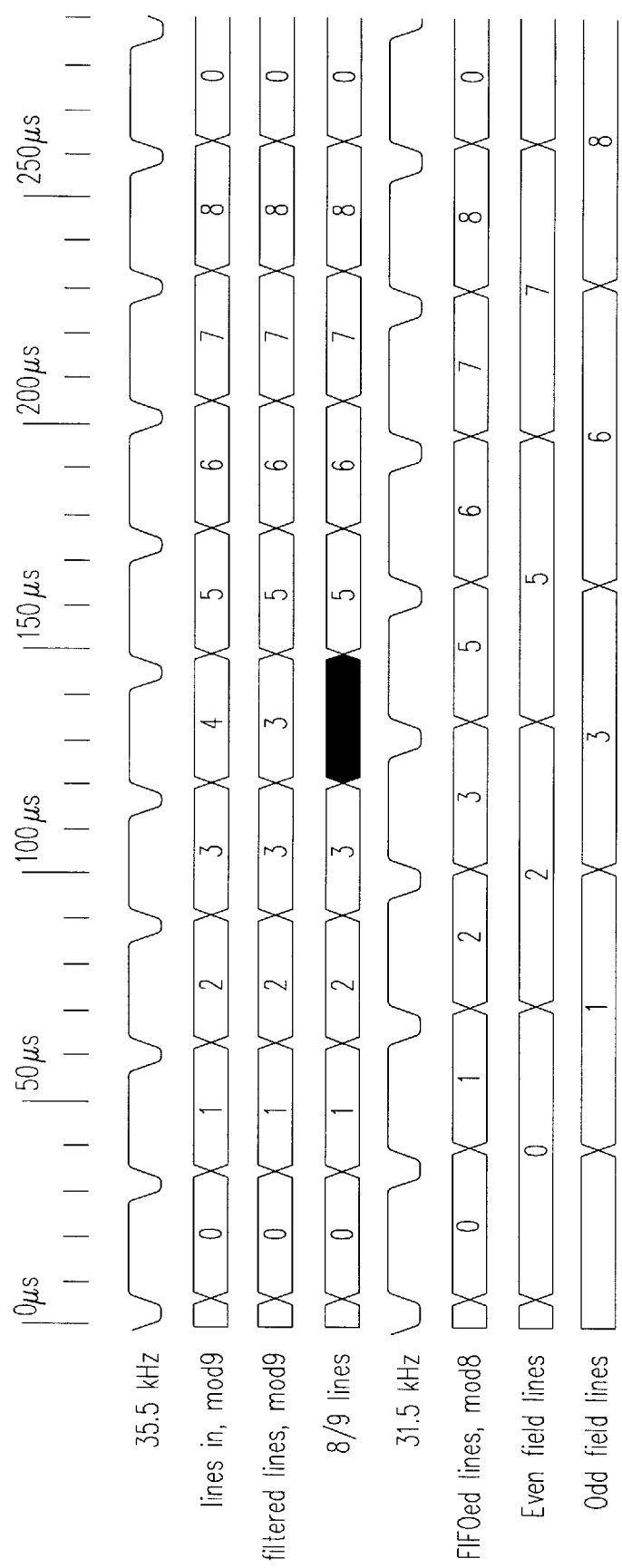
FIG. 6 is a waveform diagram for the circuit of FIG. 5.

Timing for the FIG. 5 circuit is shown in FIG. 6. The 480 active lines are converted to 428 lines using the polyphase filter. Nine incoming lines are mapped to eight outgoing lines, each a weighted sum of three or four incoming lines.

At the FIFO memory input, the horizontal frequency of the eight outgoing lines is still 35.44 kHz. Average line rate in equals average line rate out, but the incoming lines have shorter periods. One of every m lines missing equalizes the rates. At this point, the image has been vertically scaled but the occurrence of the lines is interrupted once every nine lines.

To convert this image to progressive scan for television, the one line FIFO memory 50 is provided in FIG. 5. Every outgoing eight lines are now evenly spaced over the period of nine incoming lines. Thus 425 lines are generated and 98 blank lines are appended to yield 525 lines per frame.

For interlacing, the active video is divided into 240 odd lines and 240 even lines. Odd and even lines are inserted into odd and even fields, each consisting of 262 ½ lines for NTSC or 312.5 lines for PAL. To correct the line rate to 15.75 kHz, for NTSC TV or 15.625 kHz for PAL, the FIFO memory is extended to two lines.

This disclosure is illustrative and not limiting. Further modifications will be apparent to one skilled in the art in light of this disclosure and are intended to fall within the scope of the appended claims.

I claim:

1. A method for vertical scaling of an incoming video image, the video image being an array of pixels, the method comprising the acts of:

selecting at least four vertically adjacent pixels;

convolving the selected pixels by predetermined weights; and outputting a video image having n−1 vertical lines for every n lines of the incoming video image, and further comprising the act of storing an entire frame of the output video image, thereby to accommodate a plurality of refresh rates of the incoming video image.

2. A method for vertical scaling of an incoming video image, the video image being an array of pixels, the method comprising the acts of:

selecting at least four vertically adjacent pixels;

convolving the selected pixels by predetermined weights; and outputting a video image having n−1 vertical lines for every n lines of the incoming video image, and further comprising the act of storing two or less lines of the output video image.

3. A method for vertical scaling of an incoming video image, the video image being an array of pixels, the method comprising the acts of:

selecting at least four vertically adjacent pixels;

convolving the selected pixels by predetermined weights; and outputting a video image having n−1 vertical lines for every n lines of the incoming video image and wherein the act of convolving includes multiplying each of the selected pixels by one of the predetermined weights, and adding the resulting products to arrive at a pixel in the output video image.

4. An apparatus for vertical scaling of an incoming video image, comprising:

an input port for receiving the incoming video image;

at least three series-connected line stores being coupled to the input port;

at least three multipliers, each multiplier having a first input port coupled to an output port of one of the line stores;

a modulo n counter having an input terminal coupled to receive a video line clock signal;

a decoder coupled to receive a count from the counter and storing at least two sets of coefficients, having one coefficient in each set for each multipliers, the decoder being coupled to a second input terminal of each multiplier;

an adder coupled to receive a product from the multipliers and to sum all the products; and a memory to receive the summed products.

5. The apparatus of claim 4, wherein the memory is a field buffer memory.

6. The apparatus of claim 4, wherein the memory is a FIFO memory.

7. The apparatus of claim 4, wherein n=9.

8. The apparatus of claim 4, wherein the coefficients are such as to selectively convolve three or four pixels of the original video image.

9. An apparatus for vertical scaling of an incoming video image, comprising:

a port for receiving digitized incoming video data;

a terminal for receiving a horizontal line clock signal; and a polyphase filter coupled to received the digitized video data and the clock signal and which convolves either three or four vertically adjacent pixels of the video data, using at least two different sets of coefficients, the set of coefficients for each output pixel being selected depending on a count of the horizontal line.

* * * * *